(12) United States Patent
Shilton et al.

(10) Patent No.: US 6,521,025 B1
(45) Date of Patent: Feb. 18, 2003

(54) SUPER SELECTIVE HOLLOW FIBRE MEMBRANES

(75) Inventors: Simon James Shilton, Hamilton (GB); Ahmad Fauzi Ismail, Skudai (MY)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 09/831,548

(22) PCT Filed: Nov. 9, 1999

(86) PCT No.: PCT/GB99/03732
§ 371 (c)(1),
(2), (4) Date: Jun. 28, 2001

(87) PCT Pub. No.: WO00/27512
PCT Pub. Date: May 18, 2000

(30) Foreign Application Priority Data

Nov. 11, 1998 (GB) .............................................. 9824621

(51) Int. Cl.[7] .......................... B01D 69/08; B01D 71/68; D01D 5/06; D01F 1/08
(52) U.S. Cl. ................................ 96/10; 96/13; 55/524; 55/DIG. 5; 264/514; 264/558; 264/561
(58) Field of Search .............................. 96/4, 8, 10, 13, 96/14; 55/524, DIG. 5; 264/514, 515, 558, 561, 563

(56) References Cited

U.S. PATENT DOCUMENTS

| | | | | |
|---|---|---|---|---|
| 4,209,307 A | * | 6/1980 | Leonard ..................... | 96/10 X |
| 5,181,940 A | * | 1/1993 | Bikson et al. .............. | 96/10 X |
| 5,762,798 A | * | 6/1998 | Wenthold et al. ........... | 96/10 X |
| 5,820,659 A | * | 10/1998 | Ekiner et al. ..................... | 96/8 |
| 5,917,137 A | * | 6/1999 | Ekiner .......................... | 96/8 X |

FOREIGN PATENT DOCUMENTS

EP 0 488 018 A2 6/1992

OTHER PUBLICATIONS

Ismail, A.F. et al; "Direct measurementof reheologically induced molecular orientation in gas separation hollow fibre membranes and effects on selectivity"; Journal of Membrane Science; Apr. 2, 1997; pp. 133–137; vol. 126, No. 1; Elsevier Scientific Publication Company, Amsterdam.

Pesek S. C. et al; "Aqueous quenched asymmetric polysulfone hollow fibers prepared by dry/web phase separation"; Journal of Membrane Science; Mar. 9, 1994; pp. 1–19; vol. 88, No. 1; Elsevier Scientific Publication Company, Amsterdam.

Shilton S.J. et al; "The deduction of fine structural details of gas separation hollow fibre membranes using resistance modeling of gas permeation"; Polymer; Jan. 1, 1996; vol. 37, No. 3; Elsevier Science Publishers, Great Britain.

Ismail A.F. et al; "Polysulfone gas separaton hollow fiber membranes with enhanced selectivity"; Journal of Membrane Science; Feb. 18, 1998; pp. 285–286; vol. 139, No. 2; Elsevier Scientific Publication Company, Amsterdam.

Pinnau I. et al.; "A Qualitative Skin Layer Formation Mechanism for Membranes Made by Dry/Wet Phase Invention"; Journal of Polymer Science: Part B: Polymer Physics; 1993; pp. 419–427; vol. 31; John Wiley & Sons, Inc., New York.

Shilton S.J.; "Flow Profile Induced in Spinneret During Hollow Fiber Membrane Spinning"; Journal of Applied Polymer Science; Aug. 15, 1997; vol. 65, No. 7; John Wiley & Sons, Inc., New York.

Shilton S.J.; "The reheology of fiber spinning and the properties of hollow–fiber membranes for gas separation"; Chemical Abstracts; Jan. 23, 1995; vol. 122, No. 4 (XP–002121730); Columbus, OH.

Ismail A.F. et al.; "Production of super selective polysulfone hollow fiber membrane for gas separation"; Polymer; Aug. 23, 1999; vol. 40, No. 23; pp. 6499–6506; Elsevier Science Publishers.

* cited by examiner

*Primary Examiner*—Robert H. Spitzer
(74) *Attorney, Agent, or Firm*—Alston & Bird LLP

(57) ABSTRACT

A hollow fibre membrane has an active layer (2) in which elongate polymer molecules (3) are longitudinally aligned essentially parallel to the extrusion direction to thereby define a plurality of spaced free volume cavities (4) which are particularly numerous and are essentially regularly spaced to provide enhanced selectivity when used in gas separation. The hollow fibre membrane is manufactured using a dry/wet phase separation process by spinning a dope composition which is extruded through a spinneret (12) having an annulus or annular orifice (16) together with a bore-forming fluid or coagulant. The dope composition has a power law index of less than 1 (unity) and the bore coagulant has a water activity of less than 1 (unity).

9 Claims, 2 Drawing Sheets

SUPER SELECTIVE HOLLOW FIBRE MEMBRANES

The present invention relates to hollow fibre membranes for use in gas separation.

Hollow fibre membranes are commonly employed in gas separation and the selectivity of a membrane is dependent on the properties of its active layer i.e. the outermost layer or "skin" of the membrane. In general, a thin and undamaged active layer is desirable.

Typically, a hollow fibre membrane is manufactured using a dry/wet phase separation process by spinning a dope composition which is extruded through a spinneret having an annulus or annular orifice together with a bore-forming fluid or coagulant. The nascent hollow fibre membrane emerging from the output of the spinneret passes through a dry gaseous region or "gap" before being immersed in a liquid coagulation bath. The membrane is then washed, dried and subsequently retrieved.

It is an object of the present invention to enhance the selectivity of hollow fibre membranes.

This is achieved by aligning the molecules so as to enhance the degree of molecular orientation in the active layer.

According to the present invention there is provided a method of producing a hollow fibre membrane, the method comprising the steps of:

a) providing a shear-thinning dope composition having a power law index of less than 1, b) providing a bore coagulant with a water activity of less than 1.0, c) extruding the dope composition through an annulus of a spinneret at a rate which induces levels of shear in the dope composition at the wall regions of the annulus sufficient to longitudinally align the polymer molecules in the active layer of the resultant nascent hollow fibre membrane, and d) introducing the nascent hollow fibre membrane to a convection chamber supplied with a gas for dry phase separation which produces a thin, dense active layer in which the aligned polymer molecules are fixed in position.

By virtue of the present invention the resultant hollow fibre membrane has an active layer in which elongate polymer molecules are longitudinally aligned essentially parallel to the extrusion direction to thereby define a plurality of spaced free volume cavities (being the gaps at the molecular scale between the polymer molecules) which are particularly numerous and are essentially regularly spaced. It is the presence and configuration of these cavities which typically are only a few (e.g. less than 10) Angstroms across which provides enhanced selectivity when used in gas separation.

The method of the present invention may further comprise the steps of:

e) exposing the hollow fibre membrane to an external coagulant, f) subjecting the hollow fibre membrane to solvent exchange drying, and g) treating the hollow fibre membrane with a coating solution comprising a curing agent.

Like all shear-thinning fluids, the viscosity of the dope composition used in the present invention decreases as shear rate is increased. The shear rate $\gamma$ is given by the rate of change of velocity with distance in the radial direction ($dU_z/dr$), and varies parabolically with radius across the cross-section of the emerging nascent fiber. The shear rate is at a maximum in the wall region of the fibre and increases as the rate of dope extrusion increases. The dope composition is a power-law fluid in which shear stress, $\tau$, is given by the expression $\tau = K \gamma^n$, where n is the power law index and K is the power law constant.

The power law index may be in the range of about 0.2 to 1, preferably, between 0.3 and 0.9. In a specific example the power law index is about 0.7.

Preferably, the dope composition is extruded at a rate which is sufficient to induce levels of shear in excess of 4200 $s^{-1}$. Most preferably, the shear rate (level) is about 6000 $s^{-1}$ to 12000 $s^{-1}$. In a specific example, the shear rate is about 9710 $s^{-1}$.

The dope composition generally comprises a homogeneous polymer solution. Examples of suitable polymers include polysulfone, polyethersulfone, polyestercarbonate, polyimide, polyamide and cellulose acetate. The dope composition may comprise a binary mixture of polymer and solvent. Alternatively, combinations of polymers, solvents and nonsolvents may be used. In one embodiment of the invention a four component dope composition of polysulfone, N,N dimethylacetamide, tetrahydrofuran and ethanol is employed.

The bore coagulant may comprise an aqueous salt solution, or a solvent/water mixture. Salt solutions may be used to regulate the water activity of the bore coagulant between 0.80 and 0.95. In a preferred embodiment, potassium acetate solution having a water activity of 0.9 is used as the bore coagulant.

For the purposes of the present invention, pure water (having a water activity of 1) is unsuitable for use as a bore coagulant. This is because its high water activity (of 1.0) has an adverse effect on the outer skin region (i.e. active layer) of the resulting hollow fibre membrane. In particular, the use of pure water causes solvent in the dope composition to migrate rapidly into the bore. This rapid migration causes the quality of the active layer to be compromised.

The hollow fibre membranes of the present invention are formed by a dry/wet spinning process involving forced convection in the dry gap. The dope composition is extruded through the annulus of a spinneret at a sufficient rate to induce substantial levels of shear in the dope at the wall regions of the annulus. The shear rate (rate of change of velocity with distance in the radial direction) varies parabolically with radius across the cross-section of the emerging fibre and is always highest at the wall region during extrusion. The level of shear experienced at any radial point increases with increasing dope extrusion rate. Since sufficiently high levels of shear induce molecular orientation, the greatest alignment of molecules occurs at the fibre wall during the highest dope extrusion rates. This orientation is "frozen" into the outer wall of the fibre in the dry gap by forced convection resulting in a dense outer skin region (active layer) with enhanced molecular alignment and enhanced gas separation properties.

Preferably, the ratio of the dope extrusion rate to the bore coagulant injection rate is in the range of 0.2 to 0.5, more preferably, approximately 0.3.

The nascent hollow fibre membrane is introduced directly from the spinneret into a convection chamber for dry phase separation. Preferably, a flow of a dry unreactive gas is introduced into the convection chamber at a controlled rate so as to impinge on the exterior surface of the nascent hollow fibre membrane. Examples of suitable unreactive gases include nitrogen, argon, xenon, helium and carbon dioxide. Mixtures of dry unreactive gases may also be suitable.

Preferably, the hollow fibre membrane is placed in methanol for a day, and dried in air for another day.

Once dried, the hollow fibre membrane may be externally coated with a permeable elastomeric polymer. By coating a membrane, any surface imperfections such as pores, pinholes and defects are filled. The procedure may result in a decrease in membrane permeability, but the selectivity of the membrane is enhanced. In an embodiment of the invention, the hollow fibre membranes are treated with a coating solution of, for example, polydimethylsiloxane in hexane. Preferably, the coating solution further comprises a curing agent. The treated fibre membranes are then dried in air for an appropriate length of time.

According to a second aspect of the present invention, there is provided a hollow fibre membrane suitable for use in gas separation, the hollow fibre membrane comprising an active layer formed of elongate polymer molecules which are aligned, thereby defining a plurality of regularly spaced free volume cavities, the cavities being particularly numerous.

The hollow fibre membranes of the present invention are asymmetric in that the cross-sectional structure of the membrane varies from the outer skin to the core. The membrane comprises a dense outer skin which forms the active layer and a macro-porous sponge-like substructure.

Preferably, the free volume cavities of the active layer are substantially uniform in size and shape. For example, the cavities may have an elongated shape or configuration. Preferably, the cavities measure on average about 2.0 to 6.0 Angstroms across. Most preferably, the average cavity measures about 5.4 Angstroms.

The present invention provides a hollow fibre membrane which in use, allows gases to be separated with a high degree of selectivity. Because the cavities are substantially uniform in size, gas molecules above a threshold size are prevented from permeating through the fibre walls. In conventional hollow fibre membranes, the cavities present are of a variety of sizes. As a consequence the high degree of selectivity cannot be achieved.

The regular spacing and uniform size of the cavities are a direct result of the ordered manner in which the molecules in the active layer are aligned.

During production, surface imperfections such as pores, pinholes and defects which are of the order of several hundred Angstroms in size may arise which may be filled in a separate coating step. Blocking these imperfections results in a decrease in permeability but improved selectivity. The surface area occupied by pores, pinholes or defects may be about $0.2 \times 10^{-6}$ to $2 \times 10^{-6}$ of the surface area of the active layer. In a preferred embodiment of the invention, the surface area occupied by pores, pinholes and defects is about $1.6 \times 10^{-6}$.

The active layer may be about 0.05 and 0.5 microns thick. Preferably, the active layer thickness is about 0.15 microns.

These and other aspects of the present invention will now be described with reference to Tables 1, 2 and 3 and to the accompanying drawings, in which.

Figure 1:
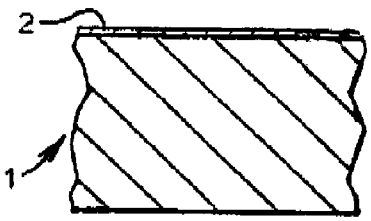
FIG. 1 is a sectional view of the wall of a hollow fibre membrane in accordance with one embodiment of the present invention.

Reference is first made to FIG. 1 of the drawings which depicts a sectional view (not to scale) of the wall 1 of a hollow fibre membrane. The active layer 2 of the hollow fibre membrane is located in the outermost layer of the membrane wall 1. The active layer 2 typically comprises less than 1/1000th of the overall thickness of the membrane wall 1. The membrane is asymmetric: the active layer 2 is dense and relatively non-porous whereas the rest of the wall 1 has a macro porous sponge-like structure.

Figure 2:
FIG. 2 shows the aligned elongated polymer molecules of the active layer of the hollow fibre membrane of FIG. 1.

FIG. 2 is a schematic diagram of the elongated polymer molecules 3 present in the active layer 2. The elongated molecules 3 are longitudinally aligned, and define elongated free volume cavities 4 which are substantially uniform in shape and size.

Figure 3:
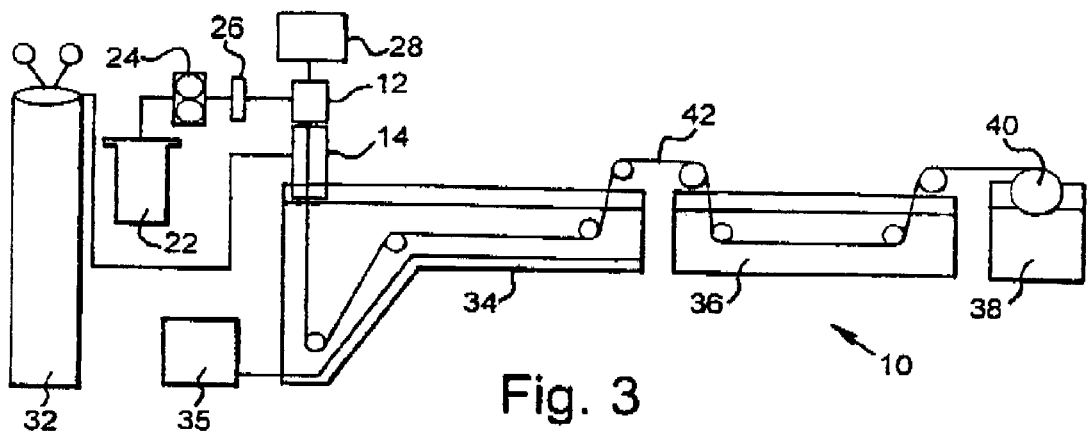
FIG. 3 is a diagrammatic view of the apparatus used to produce the hollow fibre membrane of FIG. 1.

Reference is now made to FIG. 3 of the drawings which depicts a spinning apparatus 10 for producing a hollow fibre membrane.

Figure 4:
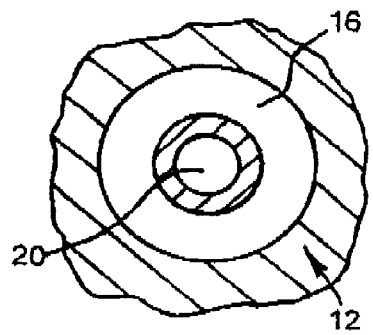
FIG. 4 is a transverse sectional view of the spinneret of FIG. 3.

The apparatus 10 comprises a spinneret 12 disposed above a convection chamber 14. As is best shown in FIG. 4, the spinneret 12 comprises an annulus or annular orifice 16 and a central capillary 20. The spinneret 12 is coupled to a dope reservoir 22 via a gear pump 24 and filter 26. The spinneret 12 is also coupled to a coagulant pump 28 as shown in FIG. 3. In use, the dope composition is extruded through the annular orifice 16, and the bore coagulant is extruded through the bore of the capillary 20. Typically: the annular orifice 16 has an outer diameter of about 600 microns; the inner diameter of the annular orifice 16 is defined by the outer wall of the capillary 20 and measures about 330 microns across; the bore of the capillary 20 is about 178 microns across.

Figure 5:
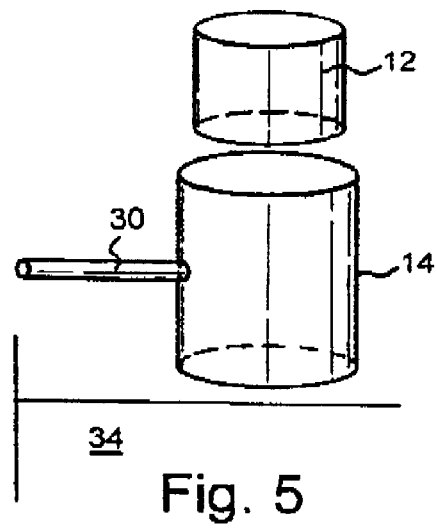
FIG. 5 is an enlarged view of the spinneret and convection chamber of the apparatus of FIG. 3.

As shown in FIG. 5, the convection chamber 14 is connected immediately beneath the spinneret 12. The convection chamber 14 defines a through-passage and comprises an inlet 30 disposed halfway along the height (length) of the chamber 14. The inlet 30 is coupled to a supply 32 of gas for dry phase separation. In use, a controlled influx of gas (e.g. nitrogen) flows in both directions along the length of the chamber 14 and is dissipated to atmosphere at the open ends of the chamber 14.

A coagulation bath 34 containing water held at a suitable temperature by controller 35 is disposed immediately beneath the convection chamber 14 (FIG. 3). The spinning apparatus 10 also comprises a washing/treatment bath 36, a wind-up bath 38 and a wind-up drum 40. A nascent hollow fibre membrane 42 emerging from the spinneret 12 is continuously extruded and led through the various components of the spinning apparatus 10 via a series of rollers. The ratio of the wind-up speed to the extrusion speed (see below) is known as the stretch ratio or jet stretch. In this embodiment of the invention, the stretch ratio is set at 1.

In use, the hollow fibre membrane 42 is formed by extruding a dope composition and bore coagulant through the spinneret 12. The dope composition is extruded through the annular orifice 16, and at the same time, a bore coagulant is extruded through the capillary 20 of the spinneret 12. By using a substantial dope extrusion rate, significant levels of shear and hence molecular alignment are achieved in the dope at the wall regions in the annular orifice 16. This molecular alignment is then fixed in the dense outer skin region (active layer) of the nascent hollow fibre membrane in the subsequent forced convection in the dry gap formed by the convection chamber 14. As shown in FIG. 5, the spinneret 12 and convection chamber 14 are closely coupled and are only spaced about 2 mm apart.

In the convection chamber 14, the controlled flow of nitrogen through the chamber 14 provides an environment or dry gap suitable for inducing dry phase separation. The nitrogen gas impinges on the exterior of the nascent hollow fibre 42, thereby "fixing" the aligned polymer molecules into position in a thin and dense active layer.

The hollow fibre membrane 42 than passes from the convection chamber 14 to external coagulation baths which contain water. The convection chamber 14 sits about 2 mm above the water level of the first external coagulation bath. The 2 mm gaps top and bottom of the convection chamber 14 allow the forced convection gas to discharge in both directions. The fibres are then steeped in water, typically for about two days.

The hollow fibre membrane 42 is then retrieved and placed in a solvent bath (not shown) for a day. The solvent helps to remove moisture from the membrane's surface. A suitable solvent is miscible with water for solvent exchange, and has a low surface tension with air to facilitate air drying. An example of a suitable solvent is methanol but other solvents may be used.

The fibre membrane is than dried in air at ambient temperature for a further day, and incorporated (potted-up) into an appropriate self-contained unit, or "module" for coating.

The module is dipped in a coating solution comprising, for example, a curing agent and polydimethylsiloxane in hexane. The coating solution coats the entirety of the active layer and, in particular, serves to fill any surface imperfections present in the active layer. Once dried, the membrane is ready for use.

Example 1

In this example, hollow fibre membranes are spun from a dope composition comprising 22% w/w polysulfone, 31.8% w/w N,N dimethylacetamide, 31.8% w/w tetrahydrofuran and 14.4% w/w ethanol. The polysulfone used is commercially available from PSF, Amoco Chemicals Udel P1700.

As summarised in Table 1, the hollow fibre membranes produced fall into four categories (I to IV). Membranes in category I and II are extruded using water as a bore coagulant. Membranes in category III and IV are extruded using 20% w/w solution of potassium acetate having a water activity of 0.9 as a bore coagulant. In all cases, the bore coagulant is extruded at approximately one third of the dope extrusion rate.

In categories II and IV, the dope composition is extruded at a high extrusion rate (2.5 cm$^3$/min [velocity of 21.1 cm/s]), corresponding to shear rate of 9710 s$^{-1}$ at the active layer or "skin" region. In categories I and III, the dope extrusion rate is fixed at 1 cm$^3$/min (velocity of 8.5 cm/s), corresponding to a shear rate of 3884 s$^{-1}$ in the skin region.

The nascent hollow fibre membranes are then led into a cylindrical convection chamber measuring 9 cm in length and 5 cm in diameter. The chamber is flushed with nitrogen at a rate of 4 litres/minute. The nitrogen is introduced through a 0.635 cm (¼") tube which abuts the chamber normal to the surface at mid-height. The gas discharges at an average speed of 1.7 cm/s through the top and bottom of the chamber. The nitrogen causes rapid and dense solidification of the polymer and fixes the aligned polymer molecules into position causing a highly ordered active layer to be formed in the membrane. Membranes in categories II and IV are exposed to nitrogen in the chamber of 0.43 s. In contrast, membranes of categories I and III are exposed to nitrogen in the chamber of 1.1 s.

On emerging from the convection chamber, the hollow fibre membranes are coagulated in pure water at 14±0.5° C. Membranes of categories I and III are coagulated for 23.0 s. Membranes of categories II and IV, on the other hand, are coagulated for 9.2 s.

After coagulation, the membranes are led into a water/treatment bath. Membranes of categories I and III are kept in the water/treatment bath for 17.5 s. Membranes I and IV are kept in the water/treatment bath for 7.0 s.

The membranes are then steeped in water for 2 days, retrieved, and placed in methanol for a further day. The membranes are then dried in air at ambient temperature.

Example 2

In this example, the finished membranes of Example I are treated with a coating solution comprising a curing agent and a 3% w/w solution of polydimethylsiloxane in hexane for 3 minutes. The modules are then dried in air at ambient temperature for a day.

Test results

The selectivities of the hollow fibre membranes of Examples 1 and 2 are measured. The permeability of each membrane with respect to pure carbon dioxide ($P_{CO_2}$) and methane . ($P_{CH_4}$) is measured in turn, at 25° C. and at a pressure drop of 5 bar. An indication as to the selectivity of the membrane is determined by calculating the ratio $P_{CO_2}/P_{CH_4}$, the results being shown in Table 2.

The uncoated fibre membranes of Example 1 exhibit relatively low selectivities. This may be due to the presence of surface imperfections or pinholes. The coated fibre membranes show higher selectivities, suggesting that the number of imperfections in the fibre membranes are greatly reduced by the coating procedure of Example 2.

the coated membranes of category IV exhibit the highest selectivity. These membranes are extruded at high dope extrusion rates using a bore coagulant with a reduced water activity. The membrane of category IV is super selective: the selectivity of such a membrane is 2.8 times greater than the intrinsic value for polysulfone. (Intrinsic selectivities are measured in respect of non-porous isotropic sheet membranes of polysulfone prepared by simple solvent evaporation techniques).

It can be seen that by reducing the water activity of the bore coagulant, and increasing the shear under which the membranes are formed, highly selective hollow fibre membranes may be produced. It can also be seen that the selectivity of a hollow fibre membrane is enhanced by coating.

In yet another test, the fine structural details of the hollow fibre membranes are investigated using gas permeation modelling techniques.

The technique is used to deduce the thickness of the active layer of a membrane. The fraction of the fibre membrane surface occupied by pores, pinholes or defects (i.e. the surface porosity) is also measured. The results are tabulated in Table 3.

The gas permeation studies show that hollow fibre membranes in category IV are the most selective. The results of the modelling study indicate that fibre membranes of category IV have moderate skin thickness when compared to the other categories of fibre. The study also indicates that the surface of category IV membranes also has a relatively high surface porosity: the fraction of the membrane's surface occupied by pores, pinholes or defects (prior to coating) is relatively high.

In further tests, the free volume cavities in the membranes are measured using positron annihilation lifetime spectroscopy (PALS). The results indicate that the average "diameter" of the cavities is approximately 5.4 Angstroms. The membranes of category IV, have more free volume cavities than the membranes of categories I, II and III.

Figure 6:
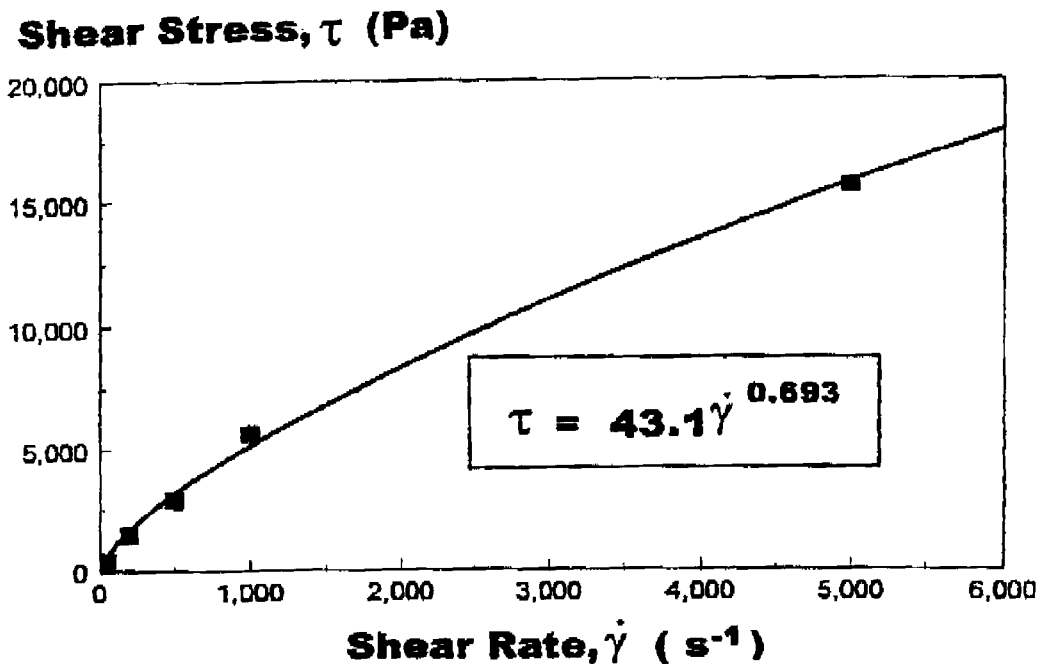
FIG. 6 is a flow curve obtained as a result of rheological tests performed on a dope composition.

In another test, the rheological properties of the dope were examined. The response of the dope to increasing shear rate was analysed in a rheometer. A shear rate range similar to that experienced in the spinneret during actual spinning was used. The test results are shown as a flow curve (FIG. 6) where shear rate is plotted against the corresponding shear stress in the material.

The results show that the dope composition of Example 1 is shear thinning, confirming that the polymer molecules in the dope composition become more aligned as shear rates increase.

Figure 7:
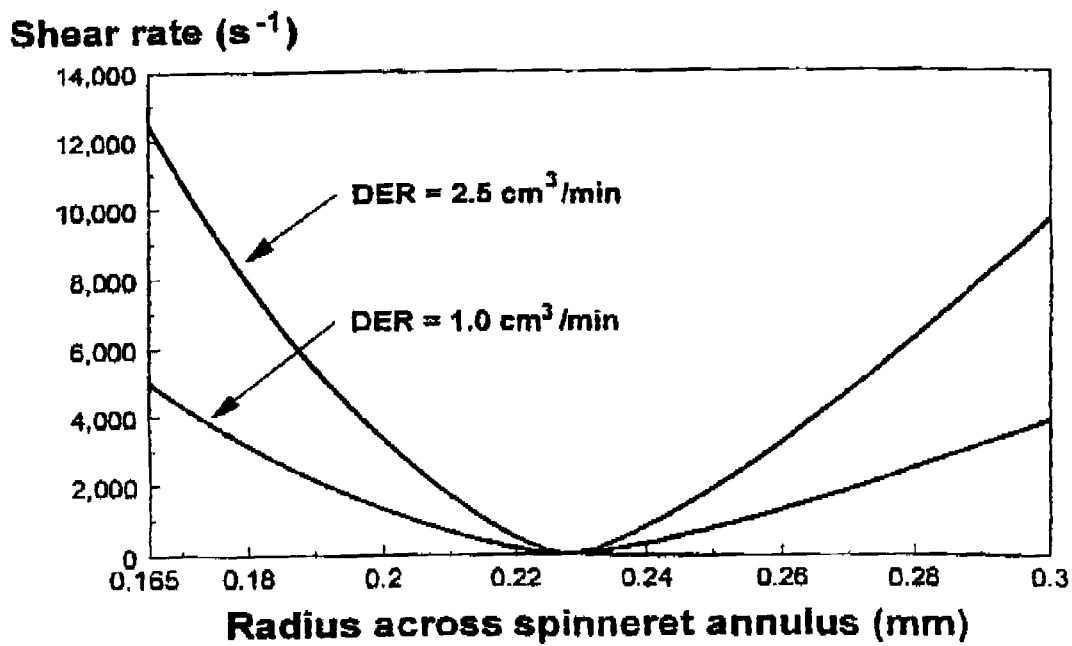
FIG. 7 shows the shear rate profiles in the spinneret for a dope composition extruded at two different extrusion rates.

As a further test, the flow profile in the orifice of the spinneret is established by solving equations for a power-law fluid in a concentric annulus. The results are shown in FIG. 7, and confirm that shear rates are highest in the vicinity of the spinneret wall. When analysed in conjunction with the results of FIG. 6, it is apparent that the polymer molecules in the outermost layer of the nascent hollow fibre membrane are most aligned. These molecules are closest to the spinneret wall and form part of the nascent active layer.

Various modifications may be made to the embodiments and examples described above without departing from the scope of the present invention.

Although a mixture of carbon dioxide and methane has been used in the tests described above, the hollow fibre membranes of the present invention may be used to separate gaseous mixtures comprising different combinations of gases.

TABLE 1

| Membrane Category | I | II | III | IV |
|---|---|---|---|---|
| Dope extrusion rate: 1 cm³/min (vel 8.5 cm/s) | ✓ | | ✓ | |
| Shear rate at skin region: 3884 s⁻¹ | | | | |
| Residence times: | | | | |
| convection chamber 1.1 s | | | | |
| coagulation bath* 23.0 s | | | | |
| washing/treatment bath* 17.5 s | | | | |
| Dope extrusion rate: 2.5 cm³min (vel 21.1 cm/s) | | ✓ | | ✓ |
| Shear rate at skin region: 9710 s⁻¹ | | | | |
| Residence times: | | | | |
| convection chamber 0.43 s | | | | |
| coagulation bath* 9.2 s | | | | |
| washing/treatment bath* 7.0 s | | | | |
| Bore: pure water | ✓ | ✓ | | |
| Bore: water activity 0.9 potassium acetate solution | | | ✓ | ✓ |

TABLE 3

| Category | I | II | III | IV |
|---|---|---|---|---|
| Active layer thickness (micron) | 0.144 | 0.093 | 0.309 | 0.148 |
| Fraction of surface area that is pores (beneath silicone coating) | $0.885 \times 10^{-4}$ | $0.661 \times 10^{-8}$ | $0.283 \times 10^{-8}$ | $1.552 \times 10^{-8}$ |

TABLE 2

| | | Uncoated | | Coated | |
|---|---|---|---|---|---|
| Category | Sample | (Pco₂) | (Pco₂/Pch₄) | (Pco₂) | (Pco₂/Pch₄) |
| I | 1 | 69.4 | 1.30 | 35.4 | 7.07 |
| | 2 | 87.0 | 1.36 | 39.5 | 7.70 |
| | 3 | 45.1 | 1.83 | 33.5 | 4.46 |
| | 4 | 45.8 | 2.93 | 24.2 | 5.73 |
| | 5 | 49.4 | 1.30 | 32.1 | 5.97 |
| | 6 | 43.7 | 1.22 | 23.1 | 4.47 |
| | 7 | 37.3 | 2.06 | 28.3 | 5.44 |
| | 8 | 65.2 | 1.39 | 68.7 | 7.81 |
| II | 1 | 64.2 | 1.71 | 47.5 | 32.1 |
| | 2 | 80.7 | 1.63 | 38.1 | 40.2 |
| | 3 | 88.2 | 2.18 | 54.7 | 13.9 |
| | 4 | 76.5 | 2.65 | 50.5 | 30.1 |
| | 5 | 81.3 | 2.64 | 50.2 | 32.7 |
| | 6 | 79.8 | 2.31 | 43.0 | 34.3 |
| | 7 | 54.8 | 3.69 | 48.8 | 13.6 |
| | 8 | 57.5 | 4.15 | 51.3 | 22.3 |
| | 9 | 62.5 | 3.50 | 58.1 | 41.5 |
| III | 1 | 17.6 | 6.45 | 14.3 | 41.1 |
| | 2 | 17.0 | 0.70 | 16.4 | 34.9 |
| | 3 | 17.9 | 2.91 | 14.4 | 46.5 |
| | 4 | 18.4 | 3.65 | 13.7 | 37.5 |
| | 5 | 17.7 | 4.82 | 14.4 | 33.1 |
| | 6 | 16.8 | 5.51 | 14.6 | 46.7 |
| | 7 | 120 | 1.54 | 35.7 | 33.6 |
| IV | 1 | 30.5 | 2.94 | 32.8 | 70.0 |
| | 2 | 58.2 | 3.11 | 33.4 | 73.0 |
| | 3 | 34.2 | 6.13 | 20.8 | 54.4 |
| | 4 | 62.1 | 2.15 | 22.8 | 41.8 |
| | 5 | 72.8 | 191 | 35.3 | 82.8 |
| | 6 | 102 | 1.62 | 38.5 | 83.1 |
| | 7 | 86.6 | 1.73 | 43.4 | 54.0 |

$P_{CO2}$ = $CO_2$ permeability or pressure-normalized flux × $10^4$ (cm³(STP)/(s cm² cmHg))

What is claimed is:

1. A method of producing a hollow fibre membrane suitable for use in gas separation, the method comprising the steps of:
   a) providing a shear-thinning dope composition having a power law index of less than 1 and greater than about 0.2;
   b) providing a bore coagulant in the form of an aqueous salt solution with a water activity in the range 0.80 to 0.95;
   c) extruding the dope composition through an annulus of a spinneret at a rate which induces levels of shear in the dope composition at the wall regions of the annulus sufficient to longitudinally align the polymer molecules in the active layer of the resultant nascent hollow fibre membrane, said levels of shear being in excess of 4200 s-1; and
   d) introducing the nascent hollow fibre membrane to a closely-coupled convection chamber supplied with a controlled influx of gas for dry phase separation by forced convection to produce at the exterior surface of the membrane a thin, dense active layer in which the aligned polymer molecules are fixed in position, thereby defining a plurality of regularly spaced and essentially uniformly-sized free volume cavities which allows gases to be separated with a high degree of selectivity.

2. The method of claim 1 wherein the power law index is in the range 0.3 to 0.9.

3. The method of claim 1 wherein the shear rate (level) is about 6000 s⁻¹ to 12000 s⁻¹.

4. The method of claim 1, wherein the bore coagulant is potassium acetate solution having a water activity of 0.9.

5. The method of claim 1, wherein the ratio of the bore coagulant injection rate to the dope extrusion rate is in the range of 0.2 to 0.5.

6. The method of claim 1, including the steps of:
   e) exposing the hollow fibre membrane emanating from the convection chamber to an external coagulant; thereafter
   f) subjecting the hollow fibre membrane to solvent exchange drying; and thereafter
   g) treating the hollow fibre membrane with a coating solution comprising a curing agent.

7. The method of claim 6, wherein the coating solution comprises a permeable elastomeric polymer to fill surface imperfections.

8. The method of claim 1, wherein the dope composition comprises a homogenous polysulphone polymer solution.

9. A hollow fibre membrane suitable for use in gas separation when made by the method of claim 1, the hollow fibre membrane comprising a thin dense active layer formed of elongate polymer molecules which are longitudinally aligned, thereby defining a plurality of regularly spaced and essentially uniformly sized free volume cavities which allows gases to be separated with a high degree of selectivity, wherein the active layer has a thickness in the range of 0.05 to 0.5 microns, and the cavities have an elongated shape or configuration and measure on average about 2.0 to 6.0 Angstroms across.

* * * * *

UNITED STATES PATENT AND TRADEMARK OFFICE
CERTIFICATE OF CORRECTION

PATENT NO. : 6,521,025 B1
DATED : February 18, 2003
INVENTOR(S) : Shilton et al.

It is certified that error appears in the above-identified patent and that said Letters Patent is hereby corrected as shown below:

Column 8, Table 2,
Under the sub-heading in the third column,
Line 2, "87.0" should read -- 67.0 --;
Line 7, "37.3" should read -- 37.8 --;
Line 29, "72.8" should read -- 72.6 --;
Line 31, "86.6" should read -- 85.6 --.
Under the sub-heading in the fourth column,
Line 2, "1.36" should read -- 1.35 --;
Line 7, "2.06" should read -- 2.05 --;
Line 19, "0.70" should read -- 9.70 --;
Line 29, "191" should read -- 1.91 --.
Under the sub-heading in the fifth column,
Line 6, "23.1" should read -- 23.7 --;
Line 25, "32.8" should read -- 32.6 --.
Under the sub-heading in the sixth column,
Line 28, "41.8" should read -- 41.6 --.

Signed and Sealed this

Twenty-second Day of July, 2003

JAMES E. ROGAN
*Director of the United States Patent and Trademark Office*